US012233527B2

(12) United States Patent
Burkhardt et al.

(10) Patent No.: US 12,233,527 B2
(45) Date of Patent: Feb. 25, 2025

(54) ADAPTIVE UTENSIL HOLDER

(71) Applicant: The United States Government as represented by the Department of Veterans Affairs, Washington, DC (US)

(72) Inventors: Brian Burkhardt, Richmond, VA (US); Seth Hills, Richmond, VA (US); John Miller, Richmond, VA (US); Melissa Oliver, Richmond, VA (US)

(73) Assignee: THE UNITED STATES GOVERNMENT AS REPRESENTED BY THE DEPARTMENT OF VETERANS AFFAIRS, Washington, DC (US)

( * ) Notice: Subject to any disclaimer, the term of this patent is extended or adjusted under 35 U.S.C. 154(b) by 433 days.

(21) Appl. No.: 17/860,524

(22) Filed: Jul. 8, 2022

(65) Prior Publication Data

US 2023/0008245 A1 Jan. 12, 2023

Related U.S. Application Data

(60) Provisional application No. 63/219,909, filed on Jul. 9, 2021.

(51) Int. Cl.
*B25G 1/00* (2006.01)
*A47G 21/02* (2006.01)

(52) U.S. Cl.
CPC ............... *B25G 1/00* (2013.01); *A47G 21/02* (2013.01)

(58) Field of Classification Search
CPC ...... A47G 21/02; A47G 21/00; A47G 21/002; A47G 21/023; A47G 21/08; A47G 2200/04; A47G 2200/046; A47J 43/00; A47J 43/28; A47J 45/00; A47J 45/06; A47J 45/07; B25G 1/00; B25G 1/102
USPC ......... 30/145, 123, 125, 128, 129, 131, 132, 30/134, 136, 137, 146, 147, 148, 149, 30/150; 16/430, 110.1, 422, 426, 427, 16/429
See application file for complete search history.

(56) References Cited

U.S. PATENT DOCUMENTS

| | | | | |
|---|---|---|---|---|
| 4,380,122 | A * | 4/1983 | Jagger | B25G 1/102 30/295 |
| 5,950,280 | A * | 9/1999 | Taylor | A47G 21/08 16/DIG. 18 |
| 8,468,700 | B2 * | 6/2013 | Wilson | B26B 5/00 83/13 |
| 9,044,853 | B2 * | 6/2015 | Phui | B25G 3/12 |
| D807,693 | S * | 1/2018 | Obmaces | D7/393 |
| 10,449,663 | B2 * | 10/2019 | Martin | A46B 17/02 |
| D951,014 | S * | 5/2022 | DeMumbrum | D7/653 |
| 2006/0025711 | A1 * | 2/2006 | Bell | A61F 5/0118 623/65 |

(Continued)

*Primary Examiner* — Phong H Nguyen
(74) *Attorney, Agent, or Firm* — Ballard Spahr LLP

(57) ABSTRACT

An adaptive holder is used to provide those lacking fine hand motor control skills and limited arm and shoulder range of motion with the ability to conveniently extend and orient utensils such as forks and spoons. Used with a universal adapter cuff, the holder includes a slotted head which receives the utensil handle. A gripping portion, attached to the head, is received by the cuff. The utensil may be angularly oriented relative to the head and is secured thereto by a frictional interference fit.

16 Claims, 4 Drawing Sheets

(56) References Cited

U.S. PATENT DOCUMENTS

2007/0209161 A1 * 9/2007 Neering .............. B43K 23/004
30/322

* cited by examiner

ADAPTIVE UTENSIL HOLDER

FIELD OF THE INVENTION

This invention relates to an adaptive utensil holder. In particular, this invention relates to an adaptive utensil holder that provides a greater range of orientation angles for the utensils relative to the hand and arm as well as compensating for the lack of range of motion in the operator.

BACKGROUND

Manipulation of eating utensils including forks and spoons can be a challenge for those lacking fine hand motor control skills. A "universal adapter cuff" has been developed to address this problem, an example of which is shown in FIG. 4 herein. The cuff 36 may be cinched to the hand and comprises a sleeve which receives and retains a utensil 38, obviating the need for the user to grasp the utensil directly.

While very useful, the universal adapter cuff according to the prior art does not address the challenges of those with limited arm and/or shoulder mobility and range of motion. There is clearly a need for an adaptive tool that addresses these challenges by providing a greater range of orientation angles for the utensils relative to the hand and arm as well as compensating for the lack of range of motion by acting as an extension of the utensil.

DETAILED DESCRIPTION

The present disclosure can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Figure 1:
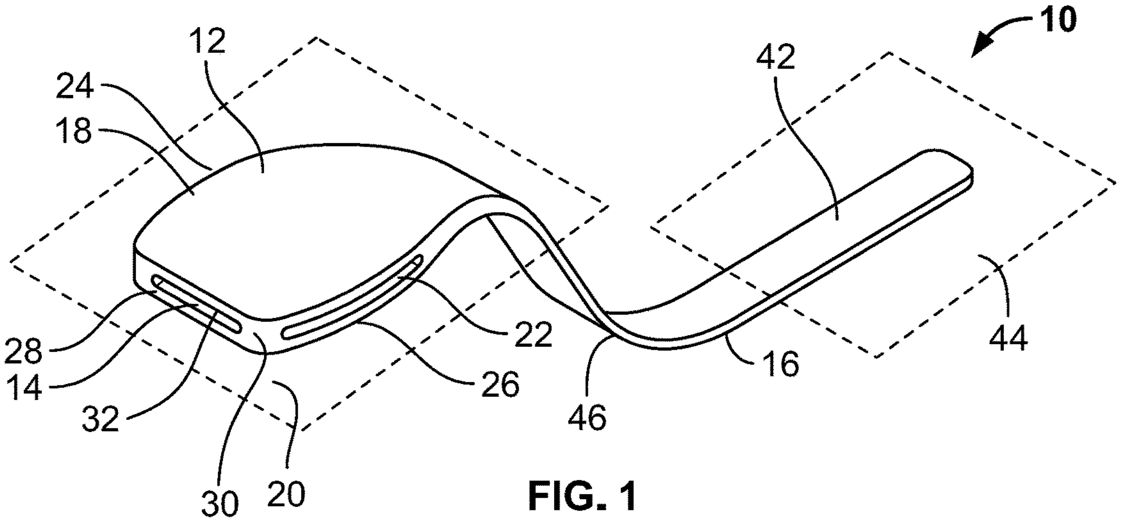
FIG. 1 is an isometric view of an example embodiment of an adaptive utensil holder according to one aspect of the disclosure.
Figure 3:
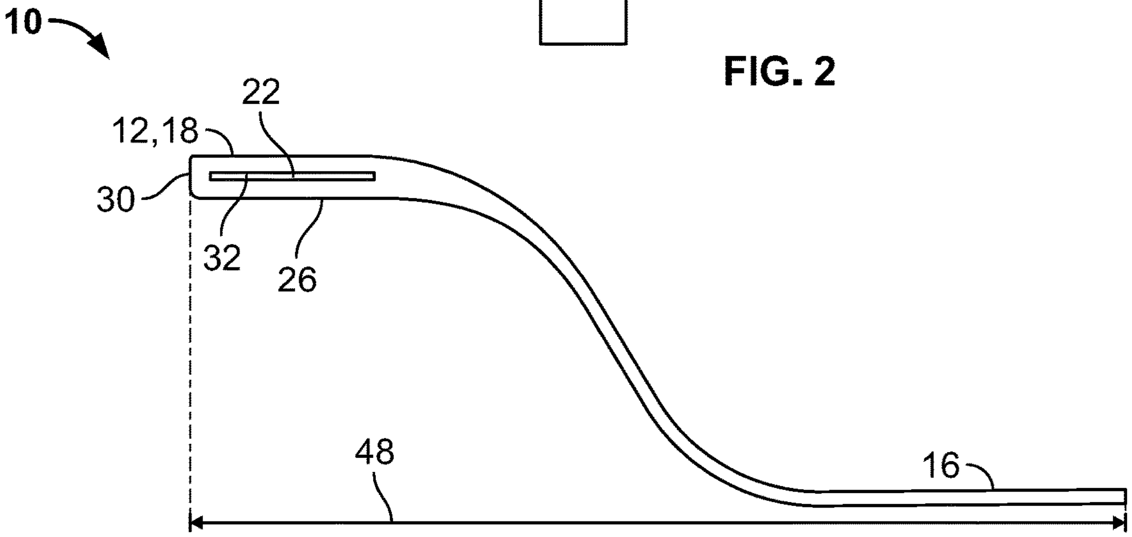
FIG. 3 is a side elevation view of the adaptive utensil holder shown in FIG. 1.

FIG. 1 is an isometric illustration of an adaptive utensil holder 10 in accordance with one aspect of the current disclosure. The adaptive utensil holder 10 is configured to engage and retain a utensil 38 (see FIGS. 5-6) such as a knife, fork or spoon. However, it should be understood that the adaptive utensil holder 10 could accommodate any functional device that an individual with limited mobility by desire operating. The adaptive utensil holder 10, in one aspect, comprises a head 12 which defines a receptacle 14 for receiving the utensil 38. In one aspect of the disclosure the handle portion 40 of the eating utensil 38 is positioned within the receptacle 14 and its position is maintained through frictional engagement. The amount of the handle portion 40 of the eating utensil 38 that is inserted in or through the receptacle 14 may be adjusted such to accommodate the comfort of the user (see FIG. 5). An elongate gripping portion 16 extends from the head 12. In one aspect shown in FIG. 3, the gripping portion 16 may be curved, an "S" shaped curve being advantageous. The head 12 may also be wider than the gripping portion 16. In one aspect the adaptive utensil holder 10 is made of a tough, elastic polymer such as nylon, and may be formed by additive methods (3-D printing), injection molded, or as an assembly of multiple parts. The use of an elastic material is advantageous because it permits small elastic deformations of the head to better grip the utensil while the elasticity allows multiple uses of the adaptive utensil holder 10 without taking a plastic set.

Figure 2:
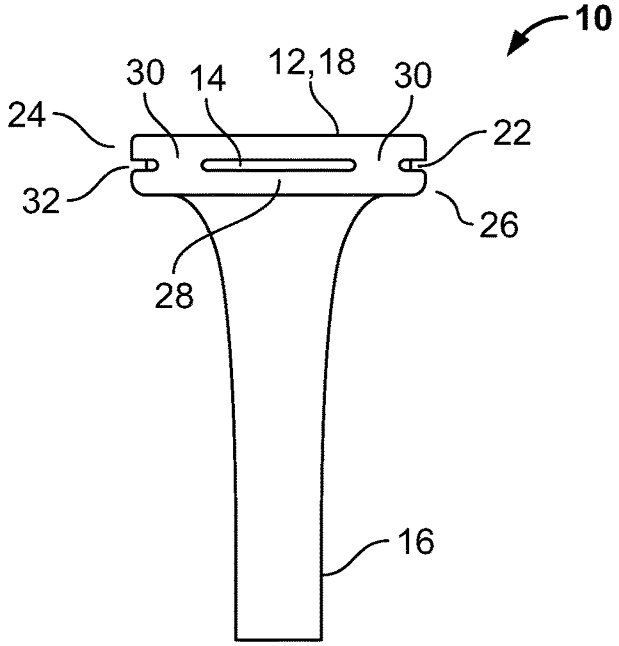
FIG. 2 is a front elevation view of the adaptive utensil holder shown in FIG. 1.
Figure 9:
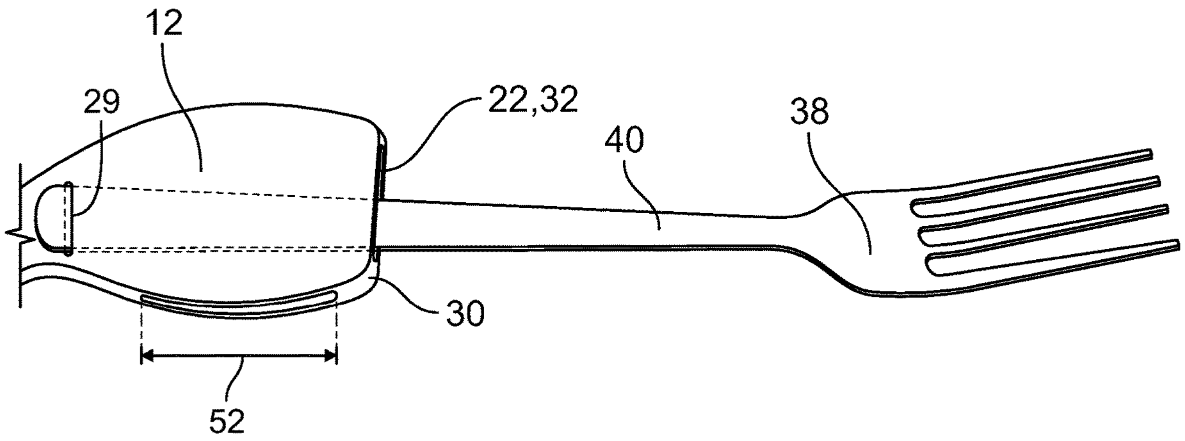
FIG. 9 is a is a side view detail of the adaptive utensil holder shown in FIG. 1, the detail showing the utensil inserted in a straight orientation and including a fourth side of the slot.

In one aspect, the head 12 comprises an oblate body 18 defining a head plane 20, and the receptacle 14 comprises a slot 22 oriented parallel to the head plane 20. As shown by way of example in FIG. 2, the slot 22 extends through the head 12 between a first side 24 and a second side 26. The first and second sides 24 and 26 are arranged opposite to one another. In another aspect shown in FIGS. 1-2 the slot 22 extends to a third side 28 of the head 12. The third side 28 is oriented transversely to the first and second sides. At least one stop post 30 is positioned within the slot 22 between the third side 28 and one of the first and second sides 22 or 24. FIG. 2 shows two stop posts 30, one on each side 24 and 26 of head 12. Stop posts 30 help define the slot openings 32 on the various sides of the head 12. The utilization of a slot 22 on either of the first side 24 and second side 26 only or the third side 28 only is also contemplated. The advantage of the slot 22 extending to all three sides 24, 26, 28 is that it allows a wide range of insertion levels and angles of the utensil 38 to accommodate the functionality and comfort of an individual while eating. In still another aspect the slot 22 may extend to a fourth side 29 (see FIG. 9).

In another aspect of the current disclosure, the gripping portion 16 may be comprised of a hand grip section 42 defining a hand grip plane 44. The hand grip plane 44 is generally parallel to the head plane 20. The head grip section 42 is connected to the head 12 a vertical displacement segment 46 that is generally transverse to the hand grip plane 44 and the head plane 20. The offset generated by the vertical displacement segment 46 allows the utensil 38 to be adjusted to a position wherein its operational end is relatively close to the lower portion of the operators hand when in use. This allows individuals with impaired functionality in the hands or arms to rest the side of their hands on a surface while utilizing the adaptive utensil holder 10. Although a variety of dimensional adjustments are contemplated for the adaptive utensil holder 10, it is known that the average sizes for cutlery vary between 5 inches for a small dessert spoon to 9 inches for knives. In one aspect of the disclosure, therefore, the vertical displacement segment 46 is approximately 3 inches in height. This allows for the adjustment of the handle portion 40 of the utensil 38 within the slot 22 such that it may be positioned in a comfortable position for the operator. The head 12 and the elongated gripping portion 16 define a holder length 48 (see FIG. 3). In one aspect, the holder length 48 is between 6 inches and 9 inches. In another aspect the holder length 48 is between 7 inches and 8 inches. The adaptive utensil holder 10 functions similar to a lever and therefore provides the advantages of the relationship of lever arms to individuals with limited mobility or motion. For a lever, where a is the input distance that the effort force moves and $d_i$ is the length of the effort arm and where $D_o$ is the output distance the load force is moved and $d_o$ is the length of the output arm, then $D_o/D_i=d_o/d_i$. In one of the aspects of the disclosure, this means that if 1-1.5 inches of the gripping portion 16 are moved by the operator and the length of the holder length 48 is between 7 and 8 inches the output length would be between 5.5 inches and inches. Therefore a single unit of motion by the operator will result in the utensil 38 being moved 4 to 7 times greater than the input movement of the operator. For a holder length 48 of 6-9 inches, this would result in movement of 3 to 8 times greater than the input movement of the operator. This allows individuals with limited range of motion to significantly increase their dexterity when utilizing utensils 38.

In one aspect of the disclosure, it is contemplated that the slot 22 defines a slot thickness 50. The slot thickness 50 is configured such that the head 12 securely grips the utensil 38 while also allowing its insertion and removal from the holder. The slot thickness 50 is designed to receive the utensil handle in an "interference" fit and relies on friction between the head and the utensil handle to fix the utensil in the desired position. In one aspect, a slot thickness 50 of about 0.06 inches has been found effective for holding eating utensils. In other aspects the slot thickness 50 may be adjusted to accommodate differing utensils 38. Similarly, the slot 22 defines a slot length 52 and the lengths of the slot openings 32, in one aspect, range from about an inch to just above an inch and a quarter. It is contemplated that adjustment of the slot length 52 may be adjusted to accommodate the different range of motions a particular individual is limited to.

Figure 4:
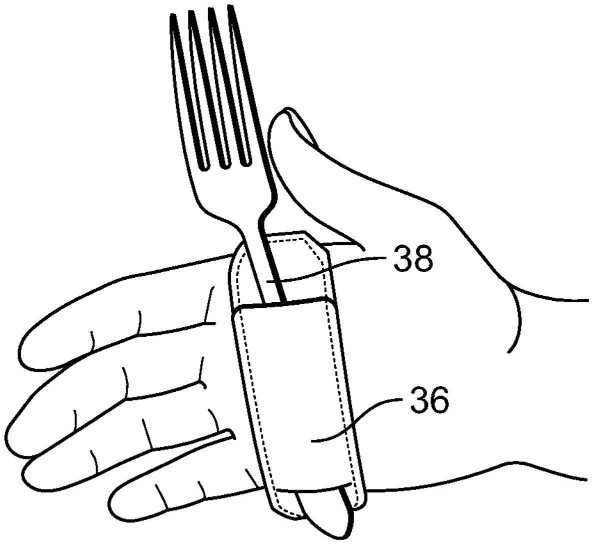
FIG. 4 (Prior Art)
FIG. 4 is an example universal cuff according to the prior art.
Figure 5:
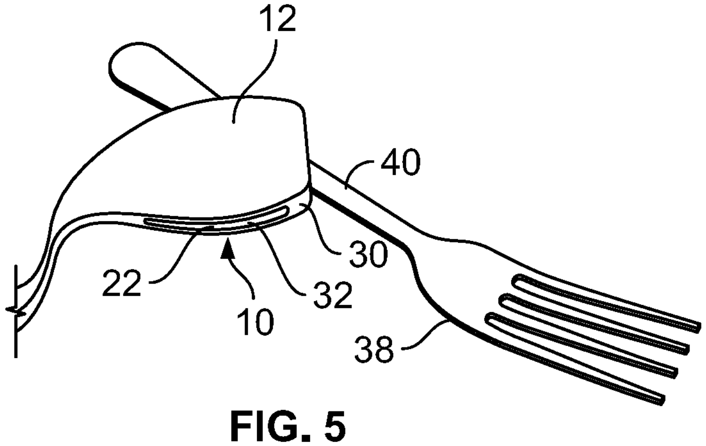
FIG. 5 is an additional detailed view of the adaptive utensil holder shown in FIG. 1, the detail illustrating a left hand configuration.
Figure 6:
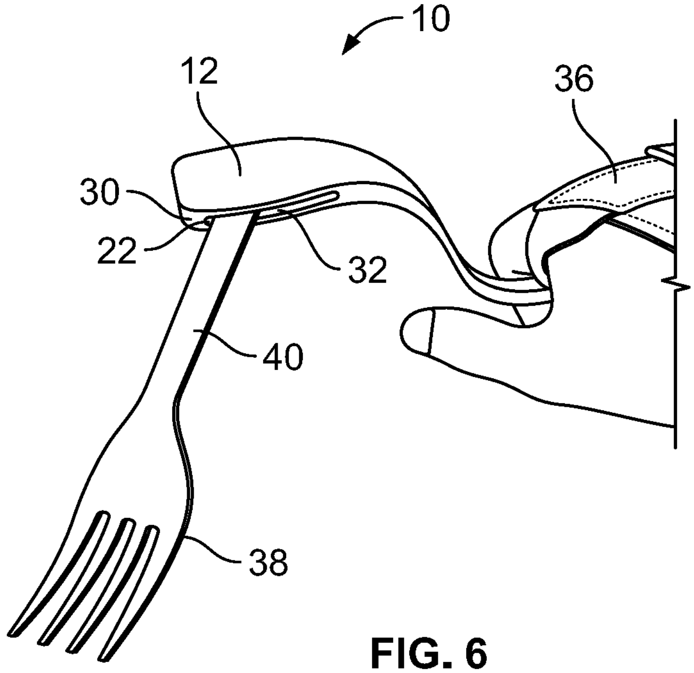
FIG. 6 is an additional detailed view of the adaptive utensil holder shown in FIG. 1, the detail illustrating a right hand configuration.
Figure 7:
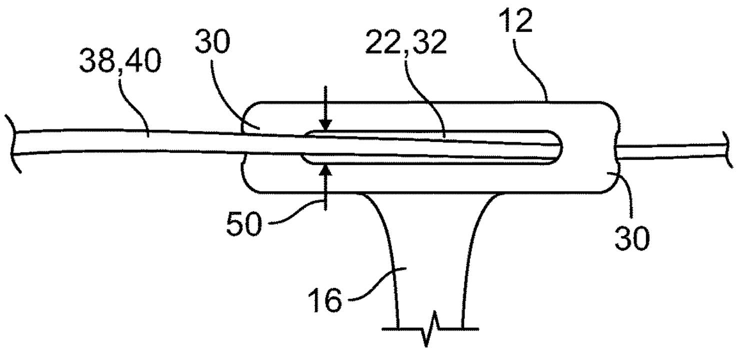
FIG. 7 is a front view detail of the adaptive utensil holder shown in FIG. 1, the detail showing the utensil inserted in an angled orientation.
Figure 8:
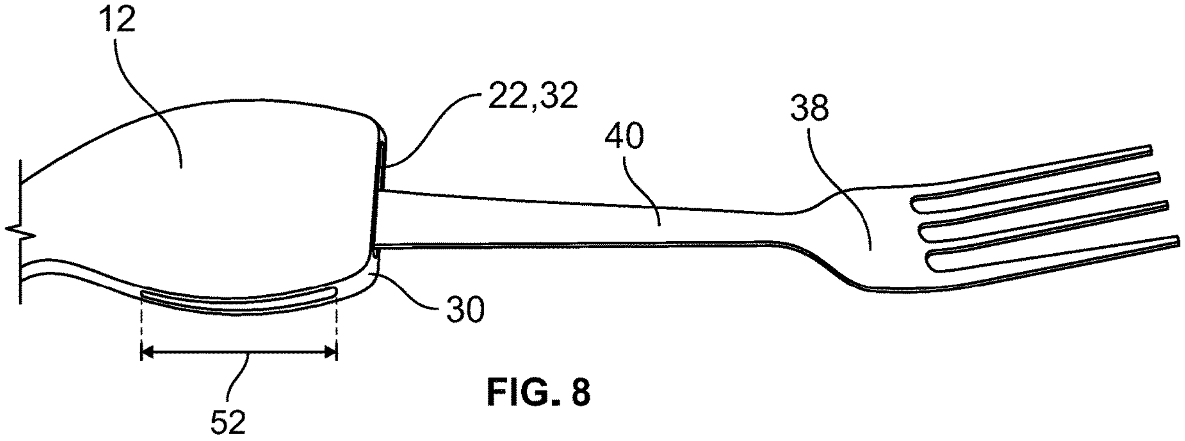
FIG. 8 is a side view detail of the adaptive utensil holder shown in FIG. 1, the detail showing the utensil inserted in a straight orientation.

FIG. 4 shows a prior art "universal cuff" 36 which is used to assist in gripping utensils 38 such as the fork shown. The universal cuff 36 is cinched to the hand of a user and receives the handle of the utensil. While the universal cuff 36 alone is effective for some users, for others, with less capability to manipulate a utensil, it is advantageous to use the adaptive utensil holder 10 between the cuff 36 and the utensil 38. FIGS. 5 and 6 show left and right hand versatility of the adaptive utensil holder 10, wherein the handle 40 of utensil 38 is inserted into the slot 22 and rested against one or more of the stop posts 30 as shown in FIG. 7. The gripping portion 16 of the holder 10 is captured by the cuff 36 similarly to how a utensil might be received. The slot 22 is sized in width The lengths of the slot openings 32 are sized to permit various practical angular configurations between the utensil 38 and the holder 10 to be achieved as illustrated in FIGS. 5 and 6. As shown in FIG. 8, the adaptive utensil holder 10 can act as an extension to the utensil 38. This may be of advantage when the operator has limited rotational functionality in their hands.

It is expected that adaptive holders such as those disclosed herein will effectively address the challenges of both the lack of fine hand motor skills as well as limited arm and shoulder mobility and range of motion.

What is claimed is:

1. An adaptive utensil holder configured to receive a utensil, said adaptive utensil holder comprising:

a head defining a receptacle for receiving said utensil; and an elongated gripping portion extending from said head;

wherein said receptacle comprises a slot, said slot extending through said head between a first side and a second side of said head, said first and second sides being arranged opposite to one another, and wherein said slot further extends to a third side of said head, said third side being oriented transversely to said first and second sides;

wherein said head comprises an oblate body defining a head plane, said slot being oriented generally parallel to said head plane; and wherein said gripping portion comprises an "S" shaped curve.

2. The adaptive utensil holder according to claim 1, further comprising at least one stop post positioned within said slot between said third side and one of said first and second sides.

3. The adaptive utensil holder according to claim 1, wherein said head is wider than said elongated gripping portion.

4. An adaptive utensil holder configured to receive a utensil, said adaptive utensil holder comprising:

a head defining a receptacle for receiving said utensil, said head defining a head plane;

an elongated gripping portion extending from said head, said elongated gripping portion comprising:

a hand grip segment defining a hand grip plane, said hand grip plane generally parallel to said head plane; and a vertical displacement segment connecting said hand grip segment to said head, said vertical displacement segment generally traverse to said head plane and said hand grip plane;

wherein said receptacle comprises a slot, and wherein said slot is oriented parallel to said head plane; and wherein said slot extends through said head between a first side and a second side of said head, said first and second sides being arranged opposite to one another, and wherein said slot further extends to a third side of said head, said third side being oriented transversely to said first and second sides.

5. The adaptive utensil holder according to claim 4, wherein said vertical displacement segment is approximately 3 inches in height.

6. The adaptive utensil holder according to claim 4, wherein said head and said elongated gripping portion define a holder length, said holder length between 6 inches and 9 inches.

7. The adaptive utensil holder according to claim 4, wherein said head and said elongated gripping portion define a holder length, said holder length between 7 inches and 8 inches.

8. The adaptive utensil holder according to claim 4, wherein said head and said elongated gripping portion are configured such that movement of said hand grip segment results in 3 to 8 times movement of the head.

9. The adaptive utensil holder according to claim 4, wherein said slot defines a slot thickness configured to retain a utensil by friction fit.

10. The adaptive utensil holder according to claim 9, wherein said slot thickness is approximately 0.06 inches.

11. The adaptive utensil holder according to claim 4, wherein said slot defines a slot length between 1 inch and 1.25 inches.

12. The adaptive utensil holder according to claim 11, wherein said slot is configured to allow a utensil to be inserted at a variety of angles relative to said head.

13. The adaptive utensil holder according to claim 4, further comprising at least one stop post positioned within said slot between said third side and one of said first and second sides.

14. A method of facilitating use of a utensil for individuals with limited range of motion with their hands, the method comprising:

providing the adaptive utensil holder of claim 4;

inserting the utensil in the slot formed in the head of the adaptive utensil holder, the utensil retained within said slot by frictional engagement;

gripping the adaptive utensil holder utilizing the hand grip segment of the elongated gripping portion connected to said head; and angling the utensil within the slot to position the utensil in a comfortable position.

15. The method as described in claim 14, further comprising:

attaching a universal cuff to the individual's hand; and inserting the hand grip segment into the universal cuff.

16. The method as described in claim 14, wherein said head and said elongated gripping portion are configured such that movement of said hand grip segment results in 3 to 8 times movement of the head.

* * * * *